United States Patent [19]

Robbins

[11] Patent Number: 4,708,197

[45] Date of Patent: Nov. 24, 1987

[54] AIR TO AIR HEAT EXCHANGER

[76] Inventor: R. Ralph Robbins, 62 Thatcher Drive, Winnipeg, Manitoba, Canada, R3T 2L3

[21] Appl. No.: 793,974

[22] Filed: Nov. 1, 1985

[51] Int. Cl.⁴ .......................... F24H 3/02; F24F 7/10
[52] U.S. Cl. ....................................... 165/54; 165/46; 165/905; 165/906; 285/222; 285/242
[58] Field of Search .................. 165/54, 905, 46, 909, 165/81, 82, 83, 906; 285/222, 242, 255

[56] References Cited

U.S. PATENT DOCUMENTS

| | | | |
|---|---|---|---|
| 3,227,630 | 1/1966 | Beckman | 165/905 |
| 3,489,209 | 1/1970 | Johnson | 165/905 |
| 3,974,022 | 8/1976 | Lauro | 165/81 |
| 4,461,344 | 7/1984 | Allen et al. | 165/909 |
| 4,512,392 | 4/1985 | van Ee et al. | 165/54 |
| 4,512,393 | 4/1985 | Maendel | 165/54 |
| 4,559,996 | 12/1985 | Andrieux | 165/906 |
| 4,579,163 | 4/1986 | Maendel | 165/54 |
| 4,616,696 | 10/1986 | Brundrett et al. | 165/54 |

FOREIGN PATENT DOCUMENTS

| | | | |
|---|---|---|---|
| 0470100 | 12/1950 | Canada | 165/54 |
| 0086175 | 8/1983 | European Pat. Off. | 165/65 |
| 2523151 | 4/1976 | Fed. Rep. of Germany | 165/909 |
| 2529981 | 1/1977 | Fed. Rep. of Germany | 285/222 |
| 2556630 | 6/1977 | Fed. Rep. of Germany | 165/909 |
| 3017431 | 11/1981 | Fed. Rep. of Germany | 165/54 |
| 3143088 | 5/1983 | Fed. Rep. of Germany | 165/83 |
| 0137551 | 12/1978 | Japan | 165/54 |
| 0612146 | 6/1978 | U.S.S.R. | 285/222 |

OTHER PUBLICATIONS

Farm Building Air to Air Heat Exchanger (Dept. of Energy, Mines & Resources, Canada), Jan. 1984.

Primary Examiner—William R. Cline
Assistant Examiner—John K. Ford
Attorney, Agent, or Firm—Adrian D. Battison

[57] ABSTRACT

An air to air heat exchanger particularly for contaminated air from an animal barn or the like includes a core formed by a plurality of thin-walled flexible plastics tubes supported at respective ends in tube sheets. The tubes are held under tension and arranged vertically in parallel rows and columns so that cold fresh air enters parallel to the rows horizontally beneath the upper tube sheet and then moved downwardly along the outside of the tubes to escape horizontally parallel to the rows above the lower tube sheet. The contaminated warm air passes from a plenum beneath the lower tube sheet upwardly along the inside of the tubes to an outlet at the top of the tubes. This direction of movement of the air causes a self-cleaning effect by condensate at the top of the tubes running down and cleaning the interior of the tubes of any collected contaminants. The design also enables the use of convenient inexpensive flexible tubes without allowing air movement to cause unacceptable flexing.

7 Claims, 6 Drawing Figures

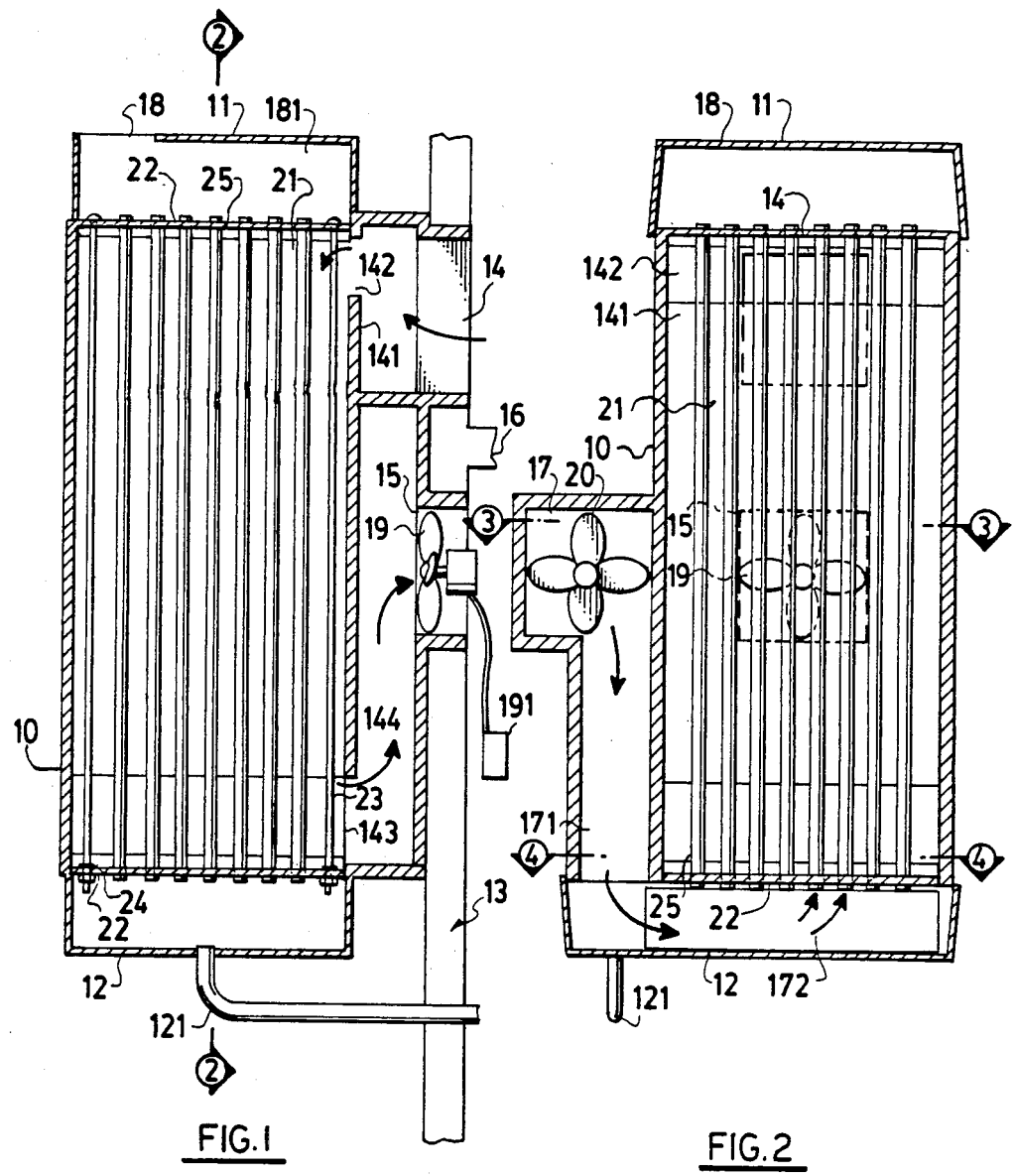

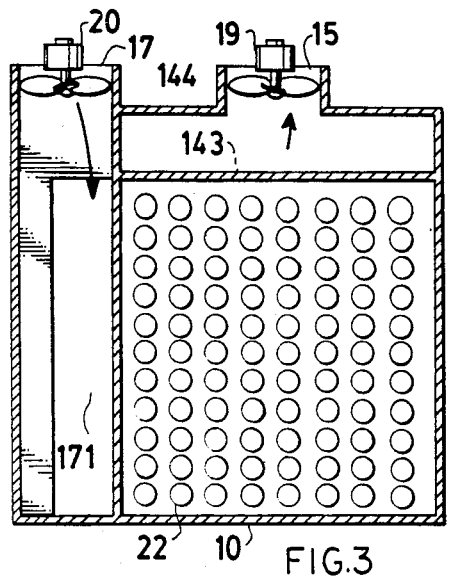
FIG.3
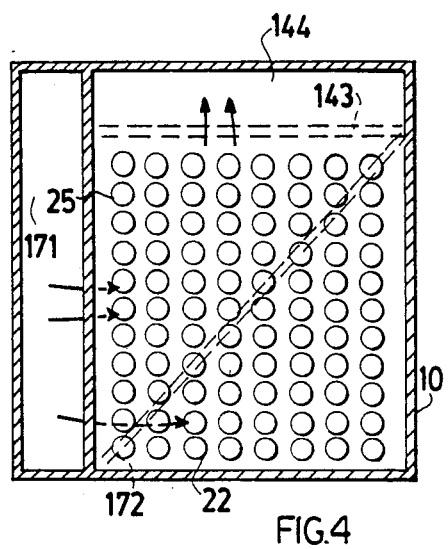
FIG.4
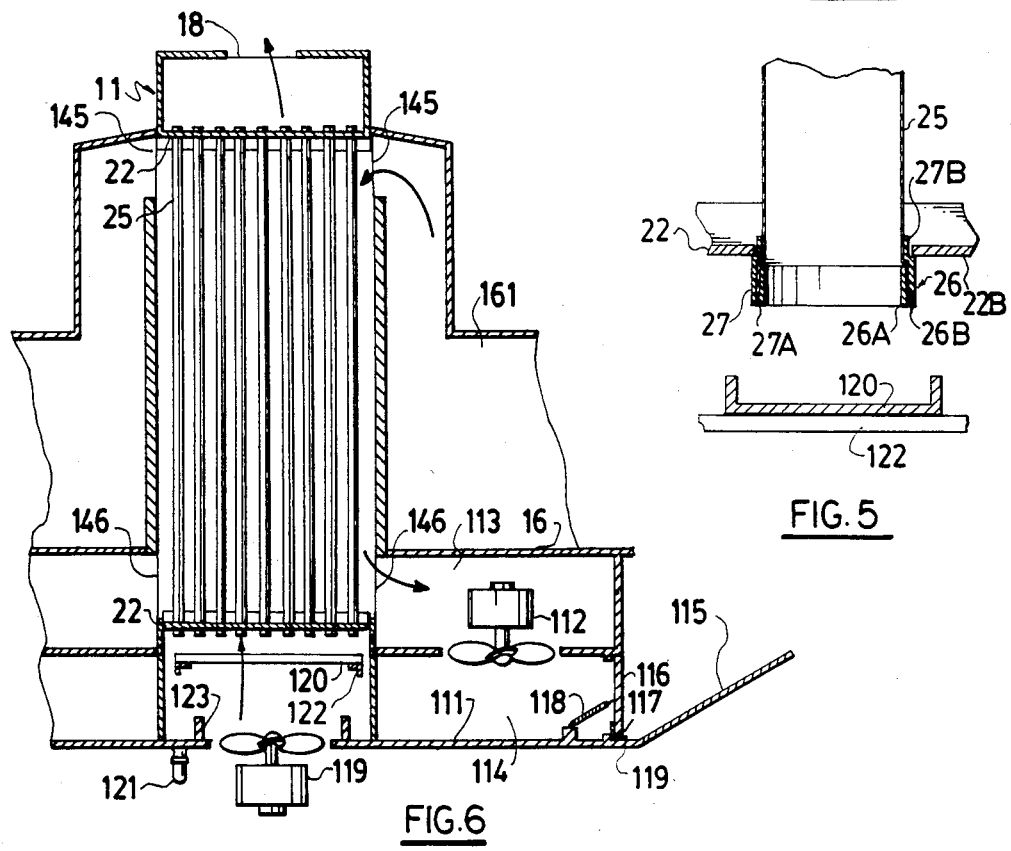
FIG.5
FIG.6

AIR TO AIR HEAT EXCHANGER

BACKGROUND OF THE INVENTION

This invention relates to a heat exchanger and particularly, but not exclusively to a heat exchanger for use in transmitting heat from warm contaminated air extracted from a building into fresh cold air drawn into the building.

In recent years, particularly in northern climates, much attention has been given to the development of heat exchangers for use in ventilating buildings while retaining a proportion of the heat in the extracted air. Devices of this type have significant advantages in animal husbandry where high levels of ventilation are necessary from a building to keep the contamination and moisture in the air to an acceptable level.

While these high levels of moisture and contaminants provide a high requirement for heat exchangers of this type, they also present serious problems in relation to the heat exchangers in view of the fact that the contaminants and moisture can be highly corrosive, and clog or block the heat exchange core and also can cause severe icing problems in view of the high level of moisture which condense as the contaminated air is cooled.

It is one object of the present invention, therefore, to provide an improved heat exchanger firstly providing an improved core construction which gives high heat transfer efficiency while being of a simple construction resistant to contamination and corrosion.

It is a second object of the present invention to provide a heat exchanger having a core which is of a design which can be self-cleaning, that is the contaminant and moisture collecting in the core are arranged to escape from the core without clogging or blocking the passage of the contaminated air.

SUMMARY OF THE INVENTION

According to a first aspect of the invention, therefore, there is provided a heat exchanger for exchanging heat between two fluids passing therethrough comprising a housing, means defining a first inlet and a first outlet in the housing for a first fluid, means defining a second inlet and a second outlet in the housing for a second fluid, a heat exchange core, means mounting the core in the housing such that the first fluid passes through the core in a first path from the first inlet to the first outlet and such that the second fluid passes through the core in a second path separate from and fluid impervious to the first path from the second inlet to the second outlet, the core comprising a plurality of elongate thin-walled flexible plastics tubes arranged in aligned parallel spaced relation, and a pair of tube support sheets spaced longitudinally of the tubes and each arranged to engage and grasp the tubes adjacent a respective end thereof, means for guiding the first fluid from said inlet through the tubes to said first outlet and means for guiding the second fluid from the second inlet between said tubes to said second outlet.

According to a second aspect of the invention there is provided a heat exchanger for exchanging heat between fresh cold air and warm contaminated air, comprising a housing, means defining in said housing a fresh air inlet and a fresh air outlet, means defining in the housing a contaminated air inlet and a contaminated air outlet, a heat exchange core, means mounting the core in the housing such that the contaminated air passes through the core in a first path from the contaminated air inlet to the contaminated air outlet and such that the fresh air passes through the core in a second path separate from and fluid impervious to the first path from the fresh air inlet to the fresh air outlet, the core comprising a plurality of straight tubular duct means arranged in parallel spaced relation with one end thereof sufficiently higher than the other end thereof such that any liquid therein can readily run from said one end to said other end, means for guiding the contaminated air from said inlet into said other end of the tubular duct means and from said one end to said outlet, means for guiding said fresh air to and past the tubular duct means in heat exchanging relation therewith such that fresh air from said fresh air inlet first encounters said tubular duct means adjacent one end thereof and flows past said tubular duct means generally in counter flow to said contaminated air and leaves said tubular duct means adjacent said other end, whereby condensation of moisture from said contaminated air adjacent said one end acts to run down and clean said tubular duct means.

The core construction therefore preferably comprises a plurality of tubes supported in spaced tube plates effectively by tension generated by moving the plates apart so that they engage collars on the respective ends of the tubes to draw apart those ends and hold the tubes under tension.

The tubes are preferably of a very thin-walled flexible construction which would normally not be self-supporting and are supported solely by the tube sheets at the respective ends.

The tubes are preferably then arranged in vertical orientation with the contaminated air driven through the tubes from the bottom by a fan arranged upstream of the tubes. The cold fresh air is arranged to pass in between the tubes adjacent the upper ends and then to run longitudinally of the tubes downwardly in counterflow to the contaminated air to escape from the area between the tubes adjacent the lower tube sheet. This causes condensation and deposit of contaminants to commence at the lower end of the tubes following which greater condensation occurs at upper ends of the tubes for the condensed liquid to run down the tubes and sweep away contaminants collecting in the relatively small amount of moisture adjacent the lower end.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a cross sectional view of a first embodiment of heat exchanger according to the invention.

FIG. 2 is a cross sectional view taken along the lines 2—2 of FIG. 1.

FIG. 3 is a cross sectional view taken along the lines 3—3 of FIG. 2.

FIG. 4 is a cross sectional view taken along the lines 4—4 of FIG. 2.

FIG. 5 is an enlarged cross sectional view of the interconnection between a tube and a tube sheet of the heat exchanger of FIGS. 1 to 4.

FIG. 6 is a cross sectional view in the same direction as FIG. 2 of a second embodiment of heat exchanger according to the invention.

In the drawings like characters of reference indicate corresponding parts in the different figures.

DETAILED DESCRIPTION

Turning firstly to the first embodiment of FIGS. 1 through 5, the heat exchanger comprises an outside housing 10 including a separate upper end cap 11 and a separate lower end cap 12 which can be removed from the main housing 10 for inspection and service. The details of mounting of the end caps and of the main housing are omitted as these will be apparent to one skilled in the art.

The housing 10 is arranged by brackets (not shown) for mounting on the exterior surface of the wall of a building generally indicated at 13. The housing includes a fresh cold air inlet 14 and a fresh air outlet 15 by which air can be drawn from a fresh air source preferably in a roof space of the building and ejected into the building through a fresh air outlet 15. A ceiling of the building is generally indicated at 16 in FIG. 1 thus positioning the inlet 14 in the roof space and the outlet 15 just below the ceiling.

A path of stale or contaminated warm air is defined by an inlet 17 positioned within the building on the same level as the outlet 15 but spaced to one side thereof as shown best in FIG. 2. The stale air outlet is indicated at 18 in the end cap 11.

In order to drive the air in the fresh air and stale air paths, there are provided respectively fans 19 and 20 positioned in the inlet 15 and outlet 17 respectively.

A core generally indicated at 21 is mounted within the housing 10 and situated to separate the cold fresh air and warm dirty air passages. The heat transfer core assembly 21 includes two identical tube sheets 22 at a top and bottom end respectively of the core both of which are formed of sheet metal and punched with approximately two inch diameter holes in rows spaced so that one inch diameter passages exist between the rows of holes. The spacing between adjacent holes in the rows is of the order of 3/16 inch, that is very much less than the spacing between the rows. Each hole is aligned with an associated hole in the opposed tube sheet so that a single tube can pass from one hole in the upper tube sheet to the associated hole in the lower tube sheet. The tube sheets are held apart by steel rods 23. Each rod 23 passes through a corresponding hole in the tube sheet 22 and is connected thereto. A suitable screw threaded portion is arranged so that by rotation of the rod, the spacing between the tube sheets can be adjusted and then locked in position by a lock nut 24.

As shown in best detail in FIG. 5, each tube comprises a thin-walled flexible tube generally indicated at 25 of a diameter of the order of two inches and having a sufficiently thin wall that it allows ready communication of heat through the wall and is generally not self-supporting if released from engagement with the tube sheets. Each tube is attached to the respective tube sheet at its end or supported upon the outer surface of the tube sheet by a ring or collar member 26. The collar member 26 comprises an inner part 26A and an outer part 27. The inner part is inserted into the end of the tube 25. The second part 27 is applied outside the tube and slid longitudinally until it engages the inner part so that it clamps the tube wall. To assist in this clamping action, the inside face 27A of the part 27 can be tapered to cooperate with a corresponding outer surface 26B of the part 26. The outer part 27 includes a turned in portion 27B to define a flange passing through the tube sheet to retain the collar member 26 in position against an outer surface 22B of the tube sheet. The turned in portion also acts to locate and abut the inner part.

Thus the core can be assembled by passing the tubes through the tube sheets while the tube sheets are in a reduced spacing following which the collar members can be applied and the spacing of the tube sheets increased to engage collar member 26 with the outer face of the respective tube sheet thus applying tension throughout the length of the tube and holding the tube in position.

Reverting to FIGS. 1 and 2, fresh air from the inlet 14 engages a transverse baffle 141 defining a slot 142 across the full width of the core at the upper tube sheet 22. This develops a stream of air across the full width of the core and travelling generally horizontally to engage the tubes 25. From the upper tube sheet 22, the air turns downwardly and runs generally along the length of the tubes 25 to an outlet 143 similar to the inlet slot 142 so that the air escapes from around the tube by moving generally horizontally at the lower tube sheet 22 into a passageway 144 in which it moves upwardly to the fresh air outlet 15 and the fan 19.

The path of stale or contaminated air leads from the inlet 17 under the propulsion from the fan 20 along a pathway 171. The inlet 17 and pathway 171 are arranged on one side of the housing 10 and lead into the end cap 12 where the passage way 171 turns at right angles to lead horizontally to a position beneath the tube plate 22. Thus the air from the inlet 17 is directed to a plenum area 172 beneath the tube plate 22 from which it can enter all of the tubes 25. The stale air then passes upwardly through the tubes 25 to the upper end from which it can escape into a similar plenum area 181 and discharge into the atmosphere through the outlet 18 in the end cap 11. The cross-sectional area of the outlet 18 is of the same order as the area of the fan 20 and less than that of the total of the tubes to generate a slight back pressure in the tubes.

Thus the fresh air moving around the outside of the tubes and downwardly along the length thereof from the fresh air inlet to the fresh air outlet is in heat exchanging but impervious relationship with the stale air moving upwardly along the inside of the tubes 25.

As the exhaust air travels upward through the tubes and gives up heat to the incoming fresh air, condensation occurs in the tube. At the point where condensation first occurs adjacent the bottom of the tube there is a tendency for progressive accumulation of dust and other contaminants in a moist (not wet) state that could cause blockage. However, the condensation formed above this point where the warm stale air is further cooled by the coldest portion or incoming part of the fresh air, runs down to thoroughly wet this accumulation.

As the contaminated air travels further upward moisture within it finally can freeze, depending upon the outside air temperature, to form ice on the inner surface of the tubes at or adjacent the top tube sheet 22. A timer unit schematically indicated at 191 is arranged to periodically halt the fan 19 to cease movement of fresh air through the core. Without fresh air travelling around the outside of the tubes 25, the exhaust air can quickly defrost the tubes. The ice formed adjacent the top of the tubes becomes slush and slides down the tubes scrubbing debris from the tubes as it drops into the lower cap 12. A drain 121 is provided in the lower cap for removing the collected liquid to a suitable collection point.

The fresh and contaminated air thus flow mainly in a direction which is counterflow and also counter to the normal convection currents developed therein, excluding of course the inlet and outlet of the fresh air which is generally in a horizontal direction at the respective tube sheets. The primary purpose of the counter convection routing of the air is to obtain an orientation of condensation and ice deposits which provide a self-cleaning feature for the heat exchanger. As the condensation drops down the tubes onto surfaces warmer than the condensate, it does so in rivulets which do not absorb significant heat from the rising contaminated air before arriving in the lower cap 12. The direction of movement of the stale air upwardly causes the condensate to run away from the coldest part of the tubes thus avoiding further freezing or formation of frost and ice accumulations at the outlet end of the tube which could cause blockage and complete failure of the unit. In addition the direction of movement of the condensate which mainly forms towards the coldest parts of the tube causes the dirt accumulation which mainly takes place at the lower end of the tube immediately condensation first occurs to be washed away.

In addition the movement of the cold fresh air downwardly under propulsion by the fan 19 is in opposition to convection currents generated by the warmer air beneath the colder air thus retaining the air in the heat exchanger for the best period of time and providing suitable mixing conducive to efficient heat transfer.

The long flexible heat transfer tubes of plastics material are unsupported except at the tube plates and by the tension therein. Such an arrangement would normally be prone to flexing of the tubes in the air movement which would soon destroy the components. The present design is however arranged to avoid such damaging flexing because of the manner in which the tubes are retained and the routing of the fresh air into down through and out of the area between the tube plates.

Specifically the mounting of the tubes within the tube plates by the collar arrangements as previously described, provides an effective locking of the tube ends into the tube plates while allowing a small degree of flexing should any movement occur.

In addition the tubes are arranged in aligned rows and columns with, in one example (not shown), fifteen tubes in each row and fifteen in each column with one inch wide air passages between the rows and 3/16 inch spacing between the columns. The rows are arranged in line with or parallel to the direction of the incoming and outgoing air from the slots 142, 143.

As some of the air enters through the slot 142 it builds up a static pressure on the upstream face of the first tier of tubes and, in response to the negative pressures developed throughout the interior of the confining housing by the fresh air fan, a portion of air moves downward around the tubes toward the fresh air outlet. At the same time a portion of the air rotates around the outside of the tube wall, clinging to the tube wall due to the Coanda effect. On the downstream side of the tube, this portion of air is suddenly decelerated as it arrives at the small space between the first and second tiers of tubes. This results in a build up of static pressure which tends to support the first tier of tubes against the velocity head of the incoming air thrusting against this upstream side. Also in response to the negative pressure developed by the fresh air fan, air moves downwardly in the space between the first and second tiers of tubes. This action is repeated again and again as the remainder of the air moves across to the far side of the core. As it does so, the air velocity becomes less and less as portions of the air move down in the spaces between the tiers of tubes. In regard to the fresh air inlet, the negative pressure is at a maximum at its face and reduces as the velocity becomes less and less.

Similarly the pressures vary at the outlet in reverse direction, that is the greatest suction is present at the face of the outlet and the suction decreases in the direction away from the face.

Static pressures are built up on both sides of the tubes to keep them from bending at the upper and lower ends where the cross flow occurs. However in the case of the lower slot of the outgoing air, the air accelerates from a relatively slow downward moving air mass spread over a large cross sectioned intermediate area within the housing. Because of the above described pressure gradient across the housing, a mild cross flow current of air occurs between the top and bottom openings.

Thus any tendency of the tubes to deflect by forces applied by the incoming and outgoing air are balanced by the pressures developed by the air rearwardly of the tubes. Such an arrangement would not occur if the tubes were not aligned in the proper rows and columns with the rows being parallel to the direction of movement of air into and out of the tube array.

With regard to sideways deflection of the tubes across the direction of incoming and outgoing airstreams, as external air is not able to enter the array at any point in the array apart from the inlet and outlet, any displacement of any tube would tend to restrict flow in one space while it enhanced flow in another. During airflows downward around the outside of the tubes, any restriction in flow in one area caused by deflection of a tube will reduce the pressure drop at that point relative to the fan pressure while increasing the pressure drop in the area which has been increased in size by the deflection. Thus the pressure will tend automatically to counter balance any deflection in the tube.

The space between the tubes below the restriction created by the deflection would be subject to increase negative pressure due to reduced air velocity which would tend to sustain the deflection. This would cause the point of restriction or deflection to move downwardly and finally out of the tube as the deflection approached the fixed spacing at the tube sheet.

If external air were able to enter the intermediate area at any point, the tendency for pressure changes outlined above to automatically counter any deflection would not occur since the incoming air would itself accommodate the pressure changes. Thus flexing could result and would be more serious particularly because the intermediate area is remote from the tube sheets where the tubes are of course held against significant movement. In order to yet further reduce any damage or problem by flexing, the tubes are formed of a lightweight plastics which is very flexible. In one example the plastics tubing is preferably of low density polyethylene and has a wall thickness of the order of 0.004 inch and this can lie in the range 0.003 inch to 0.006 inch. Such tubing is of course very flexible and would not normally be employed in an arrangement of this type because of that flexibility where any conventional tube type heat exchangers generally employ rigid tubes because of this flexing problem.

Turning now to FIG. 6, there is shown an embodiment generally of the same construction as that shown in FIGS. 1 through 4 except that it is modified for positioning basically in the roof space of a building as opposed to the exterior mounting of the embodiment of FIGS. 1 through 4. Thus the ceiling of the building is indicated at 16.

Thus in this embodiment, air is drawn from the roof space 161 through a pair of slots 145 on opposed sides of the heat exchanger in a similar manner to the slot 142 thus entering the area between the tubes 25 as previously explained. The warmed fresh air is drawn into a lower end cap 111 through lower slots 146 of similar construction to the slot 143 in FIG. 1. The end cap 11 includes a fan 112 similar in construction to the fan 19 but positioned horizontally so as to direct air downwardly from a first chamber 113 into a second chamber 114 from which it can escape via a nozzle defined by an inclined guide surface 115 into an area beneath the ceiling 16. A check valve 116 in the form of a flap is pivoted at a lower end 117 by engagement with a simple angle 119 and biased by a spring 118 into a closed vertical position as shown. Under pressure from the fan, the flap 116 can be opened and the air flow outwardly through the nozzle 115. In this condition, the spring rapidly loses mechanical advantage and allows the flap 116 to remain open while the fan 112 is running. However, immediately the fan 112 ceases, the flap 116 can close under the spring bias with the increasing mechanical advantage of the spring providing a non-linear closing force. This flap then closes off completely the fresh air movement despite any pressure differences between the interior and exterior of the building which could otherwise cause a movement of air through the fresh air path thus interfering with the de-icing process obtained by the timer 191 as previously explained. Such flap is also used in the embodiment of FIGS. 1 to 4 but is not shown.

In addition the embodiment of FIG. 6 is modified by the positioning of the fan driving the warm contaminated air into the ends of the tubes directly beneath the lower tube plate 22. The fan is indicated at 119.

In order to prevent the air from the fan 119 directly entering those tubes 25 which are closest to the effect of the fan, a baffle 120 is arranged across the bottom of the tube plate. The baffle 120 comprises a plurality of channels shown in FIG. 5 linked by angles 122 arranged at the ends with one side of the angle extending downwardly from the end to control the dripping of condensate from the ends of the channels. Each channel thus covers a plurality of tubes but is spaced from the end thereof so as to allow air to enter in an amount dependent upon the spacing of the channel from the end of the tube and the spacing between the channels. The channels terminate inside the outer most tiers of tubes so that a larger proportion of air can enter the outermost tubes that is those closest the incoming cold air flow. In addition to controlling the amount of air entering the tubes, this arrangement directs the liquid dropping from the tubes outwardly away from the fan 119. In order to avoid any liquid reaching the fan 119 before it escapes from the drain 121, a surrounding wall or dam 123 is provided outside of the area of the fan and arranged such that the liquid dropping from the channels enters the area outside the wall 123.

In an alternative arrangement (not shown), particularly a single sided version of the modified device of FIG. 6, the channels 120 can be inclined so as to be closer to the tubes furthest from the cold air inlet thus varying the amount of air entering the tubes.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A heat exchanger for exchanging heat between fresh cold air and warm contaminated air comprising a housing, means defining a fresh air inlet and a fresh air outlet in the housing, means defining a contaminated air inlet and a contaminated air outlet in the housing, a heat exchange core, means mounting the core in the housing such that the contaminated air passes through the core in a first path from the contaminated air inlet to the contaminated air outlet and such that the fresh air passes through the core in a second path separate from and fluid impervious to the first path from the fresh air inlet to the fresh air outlet, the core comprising a plurality of impermeable cylindrical plastics tubes of circular cross section arranged in aligned parallel spaced relation, each having a wall formed by an impermeable plastics material which is sufficently thin and flexible that it is not self-supporting, means for supporting said tubes consisting solely of a pair of tube support sheets spaced longitudinally of the tubes and each having means gripping the wall of each tube adjacent a respective end thereof such that longitudinal tension can be applied to the wall by the tube sheet, said supporting means mounting said tubes substantially vertically such that one end thereof is higher than the other end thereof whereby any liquid therein can readily run from said one end to said other end, such that the tubes are arranged in aligned rows with the spacing between each tube and the next adjacent tube in a row being less than the spacing between the rows, first guiding means for guiding the contaminated air from said inlet into said other end of the tubes and from said one end to said outlet and second guiding means for guiding the fresh air to said tubes from a position at one side thereof in a direction parallel to said rows and transverse to said tubes such that the fresh air from said fresh air inlet first encounters said tubes adjacent said one end and flows past said tubes generally longitudinally thereof and in counterflow to said contaminated air and leaves said tubes adjacent said other end.

2. The invention according to claim 1 including means for adjusting the position of one of said tube sheets relative to that of the other in a direction longitudinally of the tubes to apply longitudinal tension to the tubes.

3. The invention according to claim 1 wherein said gripping means comprises a collar arranged to engage a face of the tube sheet opposite to the other tube sheet with said tube passing through the tube sheet from said opposed face toward said other tube sheet.

4. The invention according to claim 3 wherein said means defining a collar comprises a first ring positioned within an end of the tube and a second ring externally of the tube, said first and second rings being shaped to allow sliding motion of the first ring within the second ring to clamp the tube therebetween.

5. The invention according to claim 1 including fan means for driving said contaminated air, said fan means being arranged upstream of said tubes whereby said fan means acts to generate a positive pressure within the tubes.

6. The invention according to claim 5 including fan means for driving said fresh air arranged downstream of the tubes.

7. The invention according to claim 1 including means for halting passage of said fresh air through said core.

* * * * *